E. J. VAUDREUIL.
PEA VINE THRESHING AND HULLING MACHINE.
APPLICATION FILED JAN. 13, 1915.
1,220,477.
Patented Mar. 27, 1917.
3 SHEETS—SHEET 1.
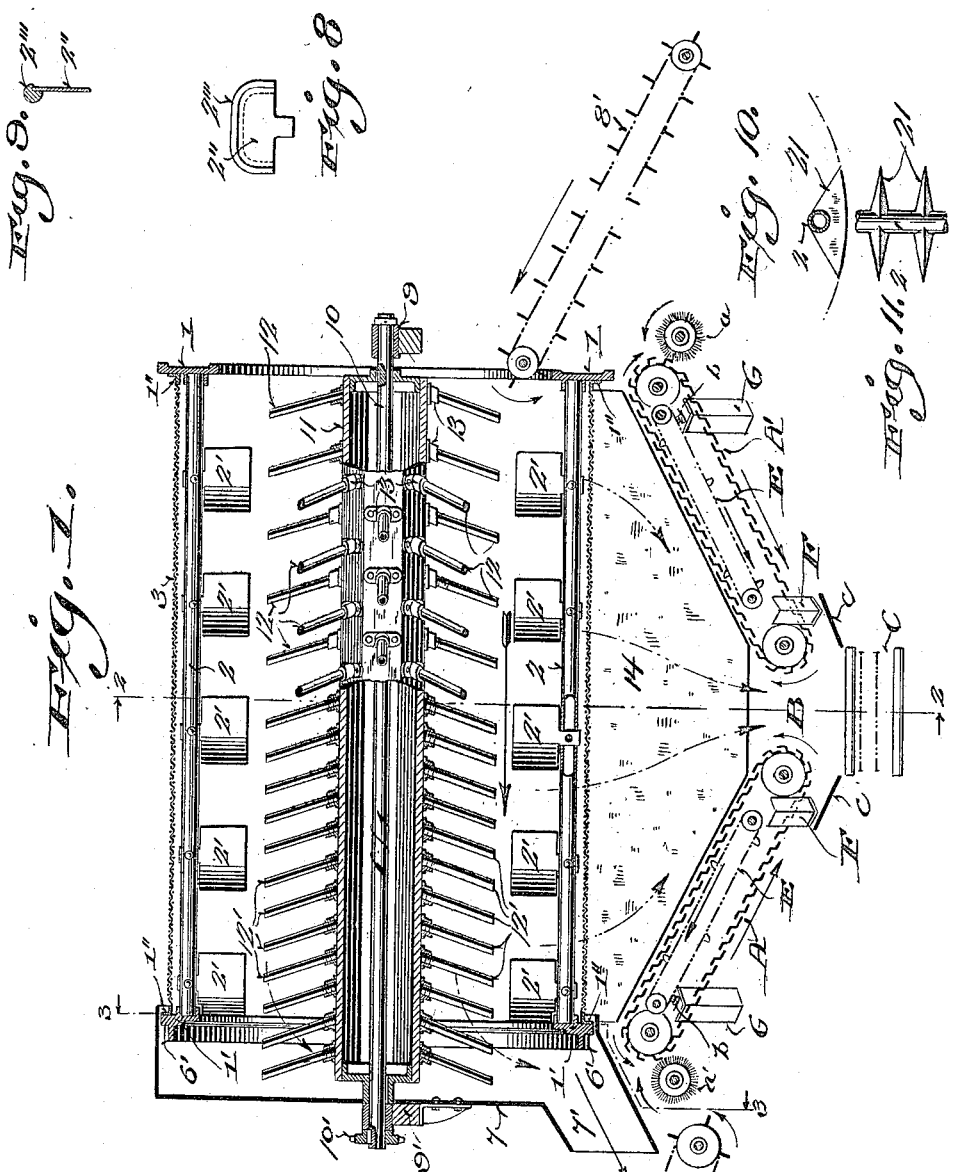

E. J. VAUDREUIL.
PEA VINE THRESHING AND HULLING MACHINE.
APPLICATION FILED JAN. 13, 1915.
1,220,477.
Patented Mar. 27, 1917.
3 SHEETS—SHEET 2.
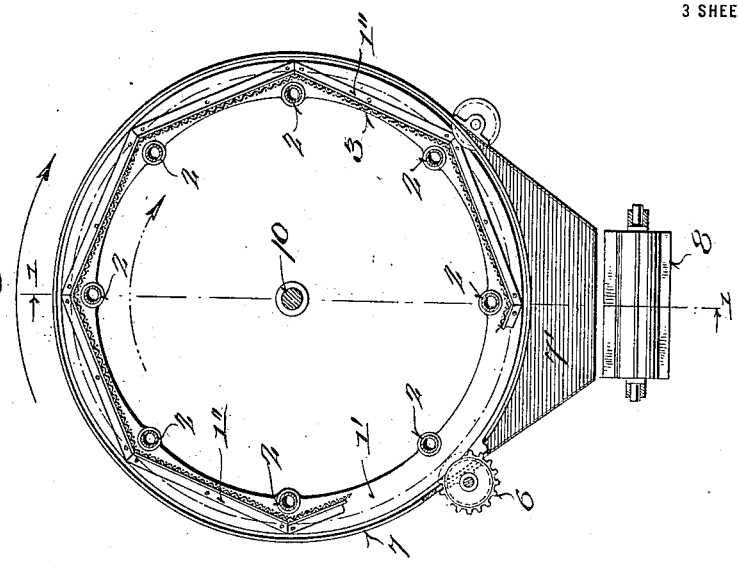
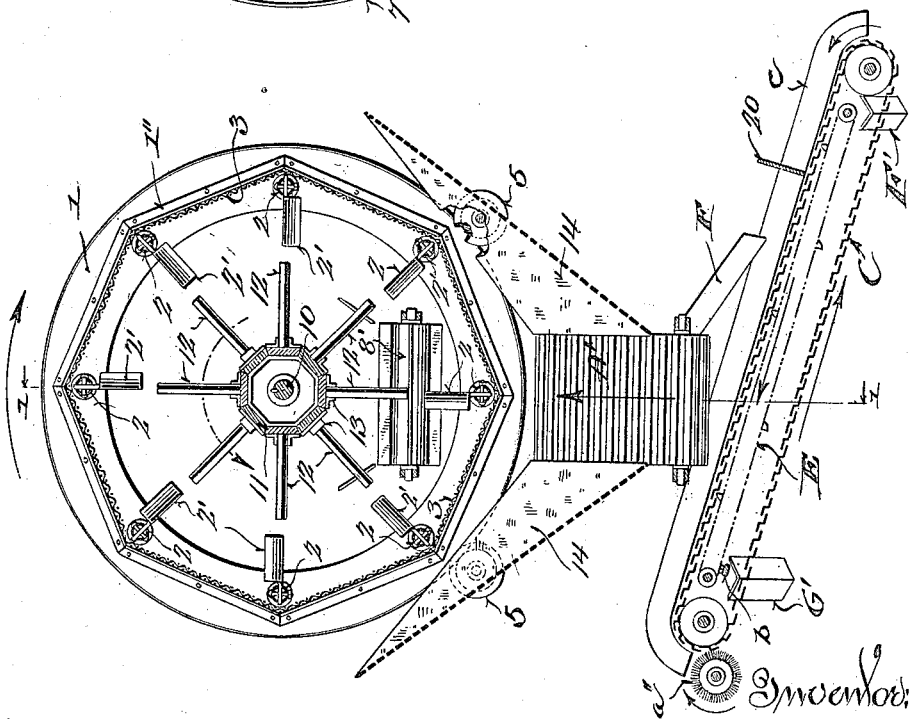

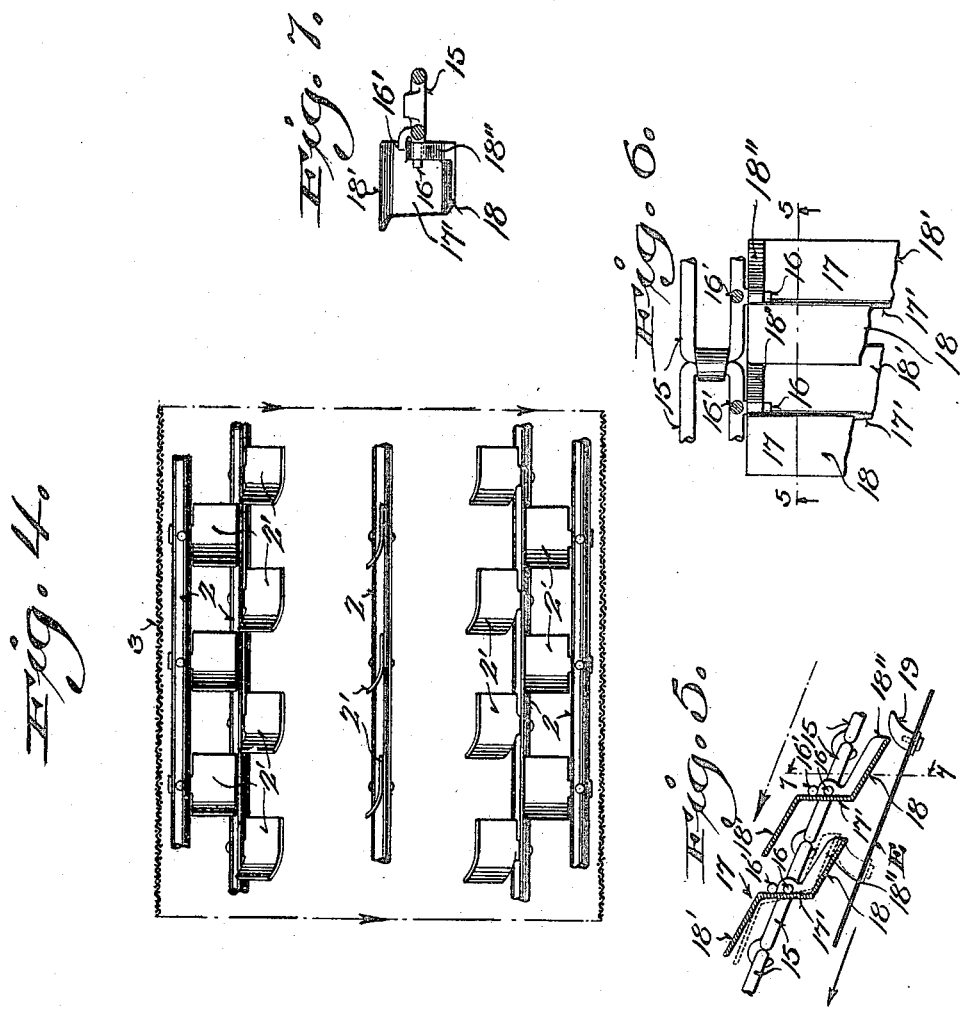

UNITED STATES PATENT OFFICE.

EDWARD J. VAUDREUIL, OF EAU CLAIRE, WISCONSIN.

PEA-VINE THRESHING AND HULLING MACHINE.

1,220,477.   Specification of Letters Patent.   Patented Mar. 27, 1917.

Application filed January 13, 1915. Serial No. 1,985.

*To all whom it may concern:*

Be it known that I, EDWARD J. VAUDREUIL, a citizen of the United States, and resident of Eau Claire, in the county of Eau Claire and State of Wisconsin, have invented certain new and useful Improvements in Pea-Vine Threshing and Hulling Machines; and I do hereby declare that the following is a full, clear, and exact description thereof.
My invention has for its object to provide a simple, economical and effective thresher, the same being especially designed as a green pea vine hulling machine.

The specific objects of my invention are to provide a skeleton frame for an outer drum member having reach-bars that are spaced from the screened jacket surface of the drum, whereby clogging of the material between the reach-bars and drum surface is eliminated;

To provide collector blades in connection with the reach-bars, the same being preferably in staggered series and provided with inclined faces whereby the material is gradually fed from the feed end to the discharge end of said drum;

To provide a core cylinder having two or more series of pins which are inclined in the direction of travel of the material whereby the feed of the same is insured, the first series of said pins nearest the feed end of the drum being spaced apart at greater intervals than the last series, whereby the material being threshed is initially subjected to a comparatively slight threshing operation relative to the last threshing operation, thus insuring a perfect separation of the material, the blades and beaters being of such construction and arrangement whereby liability of the peas being crushed in the threshing operation is eliminated;

To provide a series of inclined screening belts positioned under the drum for separating the peas from chaff or dirt, each of said belts comprising a plurality of overlapping lags having flat surfaces which are spaced apart to permit the peas to drop through while the coarser dirt or chaff is carried upwardly upon said lags and discharged, and To provide means for jarring the lags whereby peas resting thereon are caused to drop through the lags and be collected.

Another object of my invention is to provide means for automatically delivering the material to the drum and for receiving the threshed vines at its opposite end, it being understood that the drum is so constructed and arranged that peas in bunches may be delivered thereto and threshed, whereby expensive and complicated mechanism for obtaining a uniform feed of the material is eliminated.

With the above and other minor objects in view the invention consists in certain peculiarities of construction and combination of parts as set forth hereinafter with reference to the accompanying drawings and subsequently claimed.

In the drawings

Figure 1 represents a diagrammatic sectional elevation of a green pea vine hulling machine embodying the features of my invention, the section being indicated by line 1—1 of Figs. 2 and 3;

Figs. 2 and 3, represent cross-sections of the same, the sections being indicated by lines 2—2 and 3—3 respectively of Fig. 1;

Fig. 4, a fragmentary detailed sectional view of the drum mechanism, the same illustrating the preferred staggered arrangement of collector blades carried by the drum;

Fig. 5, an enlarged detailed sectional elevation of the screening belt, the section being indicated by line 5—5 of Fig. 6;

Fig. 6, a plan view of a portion of said belt;

Fig. 7, a fragmentary transverse sectional view of the belt, the section being indicated by line 7—7 of Fig. 5 showing the swivel connection between the belt chain stretches and lags thereof;

Fig. 8, a detailed face view of another form of collector blade;

Fig. 9, a detailed cross-section of the same, and

Figs. 10 and 11 represent respectively a sectional and plan view of a guard attachment for the drum reach-bars.

Referring by characters to the drawings, 1 represents an open feed head and 1' a similarly open discharge head constituting members of a skeleton drum frame. The heads are connected by longitudinally disposed reach-bars 2, which reach-bars are preferably in the form of pipe sections.
The drum-heads are provided with outer flanges 1'' for the support of a screen cloth jacket 3, which jacket is preferably composed of woven wire of the desired mesh, the said screen jacket being spaced from the reach-bars, whereby material is free to travel therebetween and thus eliminate the possibility of such material being pocketed coincident to the threshing operation. The drum may be supported in any suitable manner and, in this exemplification of my invention it is arranged to revolve upon rollers 5, which engage the periphery of the drum heads. The discharge head 1' of the drum is provided with a toothed rack 6' for meshed engagement with a driving wheel 6, as best shown in Fig. 3. The discharge head of the drum, as best shown in Fig. 1, is incased within a housing 7, having a delivery chute 7' at its bottom, which chute is arranged to discharge upon a lag conveyer 8, the said conveyer being adapted to carry off the threshed vines. A similar lag endless conveyer 8' is shown in connection with the feed head of the drum for the purpose of supplying said drum with the green pea vines to be threshed, it being understood that such material is thrown upon the conveyer 8' without regard to even distribution and the conveyer delivers such material within the drum to be threshed.

Suitable fixed frame members 9, 9' are extended transversely of the drum ends and support journal boxes for a drive-shaft 10, which drive-shaft is positioned concentric with the drum and extends therethrough. Rigidly mounted upon the drive shaft is a hollow cylinder 11, the walls of which are preferably polygonal in cross-section and, as best shown in Figs. 2 and 3, the screen jacket 3 of the drum is also fitted to the skeleton frame in the form of polygonal faces with the reach-bars 2 positioned at the points of intersection of said polygonal faces. The cylinder 11 is arranged to be driven in the same direction as that of the drum but at a much greater speed than the latter, the drive in this instance being imparted to said cylinder by a sprocket gear-wheel 10'. The feed end of the cylinder 11 is provided with a plurality of beater pins 12 which are equally spaced apart in rows that stagger each other about the circumference of the cylinder. The beater pins are affixed to the cylinder by being socketed within flanged hubs 13, which hubs, in turn, are bolted or otherwise secured to the flat polygonal surfaces of said cylinder, as shown and the pins are radially positioned and inclined toward the discharge end of the drum to thus afford inclined surfaces whereby the material is positively fed from one end to the other coincident to a threshing operation. The discharge end series of pins 12' are similar in every respect to the first series mentioned with the exception that they are much closer together to form a more compact beating element, it being observed that at the discharge end of the cylinder 11 the said cylinder projects beyond the drum head, whereby the efficiency of the threshing operation is increased and the threshed material is thus drawn clear of the cylinder and thrown out into the delivery housing 7.

As shown, the beater-pins are preferably circular in cross-section, but they may be in some instances, oval or polygonal in cross-section without departing from the spirit of my invention. In either instance, however, they constitute a continuous mesh, whereby the pods and vines will cling or fold back upon one of said beaters or a series thereof and thus receive the full impact of the blow throughout a greater area than would result if a continuous beater-blade were utilized or spaced gangs of pins. The result of this arrangement is similar in a threshing operation to hand work and the pods in place of being broken open by a smashing operation which practice has demonstrated splits or cracks the peas, are opened naturally to discharge the said peas without injury thereto. While I have shown and described the beater-pins in two series, one of which is inclined, it is obvious that, in some instances, the inclined series may be dispensed with or vice versa. It is also within the scope of my invention to arrange the beaters in uniform series or irregular and, as hereinafter stated, said beater-pins, while preferably being hollow, may, in some instances, be formed from solid sections.

The reach-bars 2 of the drum are each provided with a series of collector blades or conveyer sections 2', which blades are provided with shanks that are affixed to the bars in any suitable manner. The rows of blades are, as best shown in Fig. 4, preferably staggered with relation to each other, whereby feed from one end to the other is insured as well as to facilitate a thorough threshing operation and the said collector blades are also bent upwardly or inclined at their corresponding ends to facilitate the feed of the material through the drum. The outer edges of said collector blades are arranged parallel to the axis of the drum and spaced from the parallel ends of the beater pins 12 and 12', whereby clearance is had between these two beating elements which revolve at different speeds.

It is manifestly owing to the fact that the lifting blades are spaced apart in shovel-like form, small batches of vines will be elevated thereby and threshed individually as they come in contact with a series of beater-pins opposite each blade. This is due to the construction whereby a certain number of beater-pins are at all times positioned opposite the shovel-like lifter blades to receive the vines as they are shed from said lifter blades by gravity.

Referring particularly to Fig. 2 of the drawings, the drum is shown revolubly mounted over a pair of obliquely disposed inclined collecting aprons 14, which aprons converge toward each other and are spaced apart over a pair of deflector endless belts A, A', which constitute end aprons adapted to receive the threshed peas. These end aprons are positioned longitudinally and inclined toward the center of the drum, whereby the threshed peas are all brought to a central point relative to the length and ends of the drum, as best shown in Fig. 1. Thus, in connection with the aprons 13, the belt aprons A, A', at their converging points form a discharge throat B through which the threshed peas are delivered to an obliquely disposed transversely positioned endless screening belt C. The screening belts A and A' are mounted upon suitable rollers and are driven by any suitable mechanism in such manner that their upper working stretches travel from the throat toward the ends of the drum or in an opposite direction from their incline and the screening belt C is also similarly mounted and driven to travel in the opposite direction of its incline, said direction being indicated by the several arrows upon the drawings.

All of the screen belts just mentioned are similar in construction and each of the same is provided at its high end with a cleaner brush $a, a', a''$.

Mounted within each screening belt A, A', is an endless solid belt E preferably composed of rubber or canvas and these belts are driven by suitable mechanism with their upper working stretches arranged to travel in the same direction as the working stretches of their companion outer belts. The inner belts E form pea-collecting surfaces and are so arranged that the peas dropping through the outer belts, will roll down and be collected in delivery troughs F, while any foreign matter which may drop upon the working stretch of said belts will be carried up and discharged into chutes G, from which it is collected, the said chutes being inclined. The inner belts are also provided with suitable cleaner brushes $b$, whereby all dust collected thereon is freed. The peas thus cleaned will be deflected by wing strips $c$ upon the screen belt C, which screen belt is best shown in Fig. 2. Thus the peas are delivered upon the last mentioned belt and the operation of cleaning is repeated, the said belt $c$ being similarly equipped with an inner solid belt E', delivery trough F', and dust collecting chute G'.

In order to more clearly explain the details of the screening belts by referring to Figs. 5 to 7 inclusive of the drawing, it is apparent that the outer belts comprise pairs of endless chains 15, each link being provided with a pin 16, upon the opposite pairs of which pins are oscillatorily mounted lag plates 17. The lag plates are each formed with vertical walls 17' and an inner oblique wall 18, and a corresponding oblique outer wall 18'. Thus the lags are Z-shaped in cross-section and the outer wall portions 18' slightly overlap the inner wall portions 18. The inner wall portions are also provided with end flanges 18'', whereby they constitute chutes for guiding the peas upon the solid belt E, as best shown in Fig. 5. This solid belt is provided with a series of tappet spurs 19, which tappet-spurs engage the edges of the inner walls 18, whereby the lags are vibrated slightly as the working stretch of the belt E travels, it being understood that the last mentioned belt travels in the same direction as the outer lag belt but at a greater speed. The lags are held in their normal position by stop lugs 16' which project from the chain links 15 and engage the vertical walls 17' of said lags.

It will be observed that the beater pins are in threaded union with the socket hubs and, by this construction it is obvious that a larger number of socket hubs can be permanently attached to the cylinder than is ordinarily required, whereby, under certain conditions, the pins may be added to or removed as the case may require.

From the foregoing description it will be observed that the green pea vines, after being dropped into the feed end of the drum, are slowly gathered up by the collector plates 2' and as said plates travel upwardly with a portion of the vines thereon, when they reach the angle of discharge, the vines will be dropped downwardly in the path of travel of the rapidly revolving beater pins, whereby the threshing operation is started. These beater pins, in turn, will give the vines a series of blows and finally discharge them back upon the collector blades and the operation is repeated until all of the peas are thoroughly threshed, the hulls and vines being discharged through the delivery chute 7' of the housing 7, while the peas will drop through the mesh of the screen jacket to the cleaner belts below. It will also be observed that, after the vines travel approximately half through the drum, they will be subjected to a still greater threshing operation due to the fact that the beater pins are closer meshed from this point to the discharge end of said drum. Thus, when the vines enter the drum in tightly tangled lumps or masses, they will first be subjected to a comparatively light threshing operation, whereby they are separated or disintegrated and after such separation they are thoroughly threshed during the last period of their travel to insure that no peas will escape with the pods and threshed vines through the housing.

Figs. 8 and 9 show still another form of collector blade. The same is formed with a rearward downwardly inclined section which is also slightly curved in the same manner as that described in connection with the form of collector blade shown in Fig. 1. In the modified form of collector blade the rear corner is also slightly rounded to prevent marring the peas in threshing and the entire beating edge is provided with a rounded head 2'' whereby cutting of the peas in the operation is eliminated.

It will also be observed that, while I have shown and described the threshing drum arranged to revolve in a horizontal plane, that the same may, without departing from the spirit of my invention be equipped with adjusting mechanism whereby said drum may be tilted or slightly inclined downwardly from the feed end to the discharge end.

As best shown in Fig. 2, the screening belts may be formed with transversely disposed damming aprons 20, whereby peas which may strike upon the lags are prevented from bounding or rolling from the belt without being subjected to a proper screening operation and also to prevent such peas which drop upon the last belt of the series from being discharged outside of the receiving hopper F'. It is understood that the last belt of the series may be equipped with such damming aprons and that I may also, if desired, use some means for damming the peas in connection with the intermediate belts.

Referring to Figs. 10 and 11 I have shown guard fingers 20 in connection with the reach-bars 2, which guard fingers project in opposite directions from the bar and are spaced at suitable intervals, as shown. By this construction any peas which may collect in the cleared space will be free to travel therethrough while the vines will be deflected over the bars by the guard fingers to thus prevent their accumulation at the clearance space whereby the same will be choked.

While I have shown and described the drum members revolving in opposite directions, it is obvious that they may, in some instances, revolve in the same direction at different speeds.

It is manifest that, while I have shown and described the collector blades as being curved at one end, said collector blades may, in some instances, be flat throughout their entire area. Attention is also directed to the hollow beaters 12 which are formed with open ends and, in practice, the open ends of the tubular beaters present two points of beating contact for the pea pods as they are struck in the rotation of the beaters. For example, when a pod strikes the exterior shell or wall of one of the tubular beaters it will travel over the end of said beater and be again struck by the inner surface of the opposite circular wall of same, thus giving the pod two successive blows, which will result in effectually breaking up the pod without marring the peas.

I claim:

1. A rotary drum for threshing machines comprising open feed and discharge heads, reach-bars connecting the heads, a screen jacket incasing the reach-bars and spaced therefrom to form clearance channels, collector blades carried by the reach-bars, a rotary core cylinder mounted within the drum and adapted to be driven at a greater speed than the latter, and a series of beater pins extending from the cylinder, the same being inclined toward the discharge head, and screening means positioned under said drum.

2. A rotary drum for threshing machines comprising open feed and discharge heads, reach-bars connecting the heads, a screen jacket incasing the reach-bars and spaced therefrom to form clearance channels, collector blades carried by the reach-bars, the same being inclined to deflect material toward the discharge end of the drum, a revoluble core cylinder mounted within the drum and adapted to rotate at a greater speed than said drum, and two or more series of beater pins extending from the cylinder, the same being inclined toward the discharge head of said drum, the first series of pins nearest the feed head of said drum being spaced apart at greater intervals than that of the last series of said pins.

3. A rotary drum for threshing machines comprising open feed and discharge heads, reach-bars connecting the heads, a screen jacket incasing the reach-bars and spaced therefrom to form clearance channels, collector blades carried by the reach-bars, the same being inclined to deflect material toward the discharge end of the drum, a revoluble core cylinder mounted within the drum and adapted to rotate at a greater speed than said drum, and two or more staggered series of beater pins extending from the cylinder, the same being inclined toward the discharge head of said drum, the first series of pins nearest the feed head of said drum being spaced apart at greater intervals than that of the last series of said pins.

4. A rotary drum for threshing machines comprising open feed and discharge heads, reach-bars connecting the heads, a screen jacket incasing the reach-bars and spaced therefrom to form clearance channels, collector blades carried by the reach-bars, the same being inclined to deflect material toward the discharge end of the drum, a revoluble core cylinder mounted within the drum and adapted to rotate at a greater speed than said drum, rows of flanged socket hubs fitted to the periphery of the cylinder and staggered with relation to each other, beater pins mounted in the socket hubs, the same being inclined toward the discharge head of the drum, each row of said pins being increased in number toward said discharge end.

5. In a rotary drum for threshing machines; the combination of a revoluble core cylinder mounted within the drum, and series of hollow beaters extending from said core drum, the ends of said beaters being open to present two points of beating contact and said beater pins being arranged closer together toward the discharge end of the drum.

6. In a rotary drum for threshing machines; the combination of a revoluble core cylinder mounted within the drum, and series of hollow beaters circular in cross-section having straight open ends arranged to present two points of beating contact to the material being threshed.

7. A pulse thresher comprising an open ended screen drum, a core cylinder revolubly mounted therein, beater-pins extending from the core cylinder, and collector-blades extending inwardly from the screen cylinder in transverse alinement with certain of the beater-pins.

8. A pulse thresher comprising an open ended screen drum, spaced collector blades extending inwardly from walls thereof, a core cylinder revolubly mounted therein, and a series of beater-pins extending from the cylinder, the collector blades being spaced apart at intervals greater than the spaces between the series of beater-pins.

9. A rotary drum for threshing machines comprising open feed and discharge heads, reach-bars connecting the heads, a screen jacket encasing the reach-bars and spaced therefrom to form clearance channels, a core cylinder provided with beater pins, and a series of collector blades carried by the reach-bars.

10. A rotary drum for threshing machines comprising open feed and discharge heads, reach-bars connecting the heads, a screen jacket connecting the heads and spaced from the reach-bars to form uninterrupted clearance throats therebetween, and a core cylinder in the drum and being provided with beater pins.

11. A rotary drum for threshing machines comprising open feed and discharge heads, reach-bars connecting the heads, a screen jacket connecting the heads and spaced from the reach-bars to form uninterrupted clearance throats therebetween, a core cylinder within the drum and provided with beater pins, and a series of collector blades extending inwardly from the reach-bars.

12. A rotary drum for threshing machines comprising open feed and discharge heads, reach-bars connecting the heads, a screen jacket connecting the heads and spaced from the reach-bars to form uninterrupted clearance throats therebetween, a series of collector blades extending inwardly from each reach-bar, and a rotary beater-carrying cylinder mounted within the drum.

13. A rotary drum for threshing machines comprising open feed and discharge heads, reach-bars connecting the heads, a screen jacket incasing the reach-bars, collector blades extending inwardly from the reach-bars, a core cylinder mounted within the drum, series of beater-pins extending from the core cylinder, and means for imparting differential speeds to the drum and core cylinder.

14. A rotary drum for threshing machines comprising open feed and discharge heads, reach-bars connecting the heads, a screen jacket incasing the reach-bars and spaced therefrom to form uninterrupted clearance channels, collector blades carried by the reach-bars, a rotary beater-carrying cylinder mounted within the drum, and cleaner belts beneath said drum.

15. A rotary drum for threshing machines comprising open feed and discharge heads, reach-bars connecting the heads, a screen jacket incasing the reach-bars and spaced therefrom to form uninterrupted clearance channels, collector blades carried by the reach-bars, a rotary beater-carrying cylinder mounted within the drum, and collecting means beneath said drum.

16. A rotary drum for threshing machines comprising open feed and discharge heads, reach-bars connecting the heads, a screen jacket incasing the reach-bars and spaced therefrom to form uninterrupted clearance channels, collector blades carried by the reach-bars, a rotary-beater-carrying cylinder mounted within the drum, and cleaning and collecting means beneath said drum.

17. A rotary screen drum for threshing machines having reach-bars extending from end to end adjacent to its screen surface, collector blades carried by the reach-bars and spaced apart to form clearance throats for batches of vines, a core cylinder mounted within the drum, and an uninterrupted series of beater-pins extending from the cylinder, the beater-pins being closely meshed in comparison to the spaced collector-blades.

18. A screen drum for threshing machines having reach-bars extending therethrough, collector blades carried thereby having bead-protected edges, and a core cylinder carried by the heads and being provided with beater pins.

19. A screen drum for threshing machines having reach-bars extending therethrough, collector blades extending from the reach-bars having deflector surfaces whereby vines engaged thereby are caused to travel in one direction, and a core cylinder mounted in the drum and provided with beater pins.

20. A rotary screen drum having reach-bars, shovel-like collector blades carried thereby, and a core cylinder revolubly mounted within the drum having rows of beater-pins staggered with relation to each other adapted to receive vines from the collector blades.

In testimony that I claim the foregoing I have hereunto set my hand at Milwaukee in the county of Milwaukee and State of Wisconsin in the presence of two witnesses.

EDWARD J. VAUDREUIL.

Witnesses:
GEO. W. YOUNG,
M. E. DOWNEY.

Copies of this patent may be obtained for five cents each, by addressing the "Commissioner of Patents, Washington, D. C."